United States Patent

Ogrodnick

[11] Patent Number: 6,152,674
[45] Date of Patent: Nov. 28, 2000

[54] TRUCK DECK MOUNTED CARGO HANDLING APPARATUS WITH GROUND LEVEL LOADING AND UNLOADING POSITION

[76] Inventor: Clarence Ogrodnick, 5809-53 Street, Vegreville, Alberta, Canada, T9C 1J3

[21] Appl. No.: 09/241,931

[22] Filed: Feb. 1, 1999

[51] Int. Cl.[7] .................................................. B60P 1/64
[52] U.S. Cl. ........................ 414/498; 414/491; 414/546
[58] Field of Search .................................. 414/462, 477, 414/491, 498, 546, 679

[56] References Cited

U.S. PATENT DOCUMENTS

| | | | |
|---|---|---|---|
| 3,825,137 | 7/1974 | Mackrill et al. | 414/498 |
| 4,290,726 | 9/1981 | Sutela et al. | 414/546 X |
| 4,344,731 | 8/1982 | Visa et al. | 414/546 X |
| 4,911,318 | 3/1990 | Bishop | 414/498 X |
| 5,018,932 | 5/1991 | Croisier | 414/498 |
| 5,108,247 | 4/1992 | Vlaanderen | 414/498 X |
| 5,163,800 | 11/1992 | Raisio | 414/546 X |
| 5,203,667 | 4/1993 | Yoneda et al. | 414/477 |
| 5,232,329 | 8/1993 | Livingston | 414/494 |
| 5,620,296 | 4/1997 | McMahon et al. | 414/498 |
| 5,807,058 | 9/1998 | Masse | 414/477 |

FOREIGN PATENT DOCUMENTS

| | | | |
|---|---|---|---|
| 2522896 | 12/1976 | Germany | 414/491 |
| 286137 | 1/1991 | Germany | 414/491 |
| 3922811 | 1/1991 | Germany | 414/491 |
| 4138512 | 5/1993 | Germany | 414/491 |

OTHER PUBLICATIONS

Drawing sheets p. 3—5, of U.S. patent Ser. No. 5,755,549, issued May 26, 1998.

*Primary Examiner*—James W. Keenan
*Attorney, Agent, or Firm*—Christensen O'Connor Johnson Kindness PLLC

[57] ABSTRACT

A truck deck mounted cargo handling apparatus has a cargo carrier movable from a transport position resting upon a support frame to a loading and unloading position resting at ground level. In operation secondary lifting arms are moved to a lifting position by secondary actuators to move a first end of the cargo carrier toward a second end of the support frame. Primary lifting arms are then moved by primary actuators through a range of motion of at least 110 degrees to push the first end of the cargo carrier past the second end of the support frame and lower the cargo carrier to ground level.

29 Claims, 13 Drawing Sheets

6,152,674

TRUCK DECK MOUNTED CARGO HANDLING APPARATUS WITH GROUND LEVEL LOADING AND UNLOADING POSITION

FIELD OF THE INVENTION

The present invention relates to a truck deck mounted hydraulic cargo handling apparatus with a ground level loading and unloading position

BACKGROUND OF THE INVENTION

There are numerous cargo handling apparatus that mount onto a deck of a truck in order to move cargo between a transport position and a loading or unloading position. Relatively few of these cargo handling apparatus have a ground level loading and unloading position.

U.S. Pat. No. 5,755,549 and U.S. Pat. No. 5,807,058 are examples of cable or chain driven cargo handling apparatus with ground loading and unloading positions. It is generally recognized that hydraulic systems can carry greater loads and are more reliable than cable or chain driven apparatus. There are, however, problems associated with converting cable or chain driven cargo handling apparatus for use with expandable actuators. A suitable configuration of lifting arm has to be devised, along with the positioning of the expandable actuators to effect the desired movement of the lifting arm or arms. U.S. Pat. No. 5,620,296 discloses one configuration of truck deck mounted cargo handling apparatus that has a ground level loading and unloading position and uses expandable actuators.

SUMMARY OF THE INVENTION

What is required is an alternative configuration of truck deck mounted cargo handling apparatus that has a ground level loading and unloading position and uses expandable actuators.

According to the present invention there is provided a truck deck mounted cargo handling apparatus with a ground level loading and unloading position. The cargo handling apparatus includes a support frame having a first end, a second end, and opposed sides. The support frame is secured to a truck deck. A cargo carrier is provided having a first end, a second end, and opposed sides. The cargo carrier is movable from a transport position resting upon the support frame to a loading and unloading position resting at ground level. At least one primary lifting arm is provided having a first end and a second end. The second end of the primary lifting arm is pivotally secured at the second end of the support frame for movement between a resting position on the support frame and a lifting position in an angular orientation to the support frame. At least one primary expandable actuator is provided having a first end and a second end. The first end of the primary actuator is pivotally secured at the first end of the support frame. The second end of the primary actuator is pivotally secured to the primary lifting arm. The primary actuator is expandable to raise the primary lifting arm from the resting position through a range of motion of in excess of 110 degrees in the lifting position. At least one secondary lifting arm is provided having a first end and a second end. The second end of the secondary lifting arm is pivotally secured to the primary lifting arm. The first end of the secondary lifting arm is pivotally secured to the first end of the cargo carrier. The secondary lifting arm is moveable from a resting position to a lifting position. In the resting position the secondary lifting arm rests upon the at least one primary lifting arm. In the lifting position the secondary lifting arm is in an angular orientation relative to the primary lifting arm. At least one secondary expandable actuator is provided having a first end and a second end. The first end of the secondary actuator is pivotally secured at the first end of the primary lifting arm. The second end of the secondary actuator is pivotally secured to the first end of the secondary lifting arm. The secondary actuator is expandable to raise the secondary lifting arm from the resting position to the lifting position. In operation the secondary lifting arm is moved to the lifting position by the secondary actuator to move the first end of the cargo carrier toward the second end of the support frame. The primary lifting arm is moved by the primary actuator through a range of motion of at least 110 degrees to push the first end of the cargo carrier past the second end of the support frame and lower the cargo carrier to ground level.

The truck deck mounted hydraulic cargo handling apparatus, as described above, provides an alternative configuration of that uses expandable actuators to move the cargo carrier to and from a ground level loading and unloading position.

It is preferred that the cargo carrier is a platform, although depending upon the nature of the cargo other forms of cargo carriers may be utilized. It is preferred that two primary lifting arms, two primary expandable actuators, two secondary lifting arms and two secondary expandable actuators be used. The use of pairs of lifting arms is viewed as being more stable under load than when a single primary lifting arm and a single secondary lifting arm is used. It is preferred that the primary expandable actuator and the secondary expandable actuator be hydraulic. Of the alternative technologies for expandable actuators currently available, hydraulics is the most reliable.

Although beneficial results may be obtained through the use of the truck deck mounted cargo handling apparatus, as described above, it is preferred that vertical attachment members be positioned on the opposed sides at the first end of the cargo carrier. The use of vertical attachment members reduces the distance that cargo carrier must be lowered to ground level.

Although beneficial results may be obtained through the use of the truck deck mounted cargo handling apparatus, as described above, it is preferred that the secondary lifting arm be in the form of a crook, such as a "C" shape or an "L" shape. This crook shapes enables the secondary lifting arm to reach over a tailgate of a truck.

Although beneficial results may be obtained through the use of the truck deck mounted cargo handling apparatus, as described above, it is preferred that the cargo platform is supported by rollers positioned on the opposed sides at the second end of the support frame. Rollers reduce friction so there is less restriction to movement of the cargo platform. Even more beneficial results may be obtained when the rollers are wedge shaped, Wedge shaped rollers help urge the cargo platform into alignment with the support frame. Alignment becomes important when the cargo platform is lifted from ground level and positioned back onto the support frame. Even more beneficial results may be obtained when the rollers are supported by a shaft that is journaled for rotation along its length by at least two load bearings. The rollers must bear both the weight of the cargo platform and any cargo placed upon it. Depending upon the cargo being carried the load capacity of the rollers can become important.

Although beneficial results may be obtained through the use of the truck deck mounted cargo handling apparatus, as described above, it is important that the primary lifting arms have a range of movement between 110 degrees and 160 degrees. If the range of movement is less then 110 degrees the distance becomes too great for secondary lifting arms to reach down to place cargo platform at ground level. If the range of movement is in excess of 160 degrees, primary lifting arms have problems lifting cargo platform from ground level. Even more beneficial results may, therefore, be obtained when pivotal linkages are provided between the primary lifting arms and the second end of the primary hydraulic actuators to increase the range of motion of the primary lifting arms in the lifting position.

Although beneficial results may be obtained through the use of the truck deck mounted cargo handling apparatus, as described above, when primary hydraulic actuators begin their motion, the motion from a resting position has a substantial horizontal force component. With use over time, this horizontal force can strain the pivotal connection between the second end of the primary hydraulic actuators and the primary lifting arm. Even more beneficial results may, therefore, be obtained when motion converting linkages are provided at the pivotal connection between the primary lifting arms and the second end of the primary hydraulic actuators. Each of the motion converting linkages include a first leg and a second leg. The second leg has a first end and a second end. The second end of the second leg is pivotally secured to the support frame. The first leg has a first end and a second end. The second end of the first leg is pivotally secured to the first end of the second leg with a rotational stop being positioned therebetween to limit rotational motion. The first end of the first leg is secured to the pivotal connection between the primary lifting arm and the primary actuator. The first leg and the second leg pivot where connected in response to force exerted by the primary actuator until the rotational stop is encountered and thereafter provide resistance to expansion of the primary actuator to force the primary actuator to assume an upwardly inclined orientation during expansion.

Although beneficial results may be obtained through the use of the truck deck mounted cargo handling apparatus, as described above, it is preferred that wheels or rollers be positioned at the second end of the cargo platform. This facilitates movement of the cargo platform along a ground surface as it moves to its final loading and unloading position. In the absence of such wheels or rollers, resistance from the ground surface can stress the apparatus. Even more beneficial results can be obtained when wheels or rollers are also positioned at the first end of the cargo platform. This enables the cargo platform to be moved along the ground surface once detached from the secondary lifting arms, as will hereinafter be further described. Even more beneficial results may be obtained when omnidirectional castor wheels are positioned at the first end of the cargo platform. This enables the cargo platform to be manually steered when detached from the secondary lifting arms. When the apparatus is used in the winter time to carry snowmobiles, wheels and conventional rollers tend to sink into the snow. Even more beneficial results may, therefore, be obtained in winter conditions when a single cylindrical roller is positioned at the second end of the cargo platform. The single cylindrical roller extends between the opposed sides of the cargo platform and tends to float the cargo platform over the surface of the snow. As the single cylindrical roller moves over snow, it tends to slid laterally when unloaded on a sloped ground surface. Even more beneficial results may, therefore, be obtained when the single cylindrical roller has guide flanges. The guide flanges give the single cylindrical roller increased lateral stability.

Although beneficial results may be obtained through the use of the truck deck mounted cargo handling apparatus, as described above, even more beneficial results may be obtained when the cargo platform can be detached. It is, therefore, preferred that quick release linkages be provided at pivotal connections between the first end of each of the secondary lifting arms and the vertical members of the cargo platform. Even more beneficial results may be obtained when the quick release linkages include pins and pin engaging jaws movable between open and closed positions. One of the pins and the pin engaging jaws is positioned on the first end of the secondary lifting arms. The other of the pins and the pin engaging jaws is positioned on the vertical members of the cargo platform. The jaws are movable to the open position to permit withdrawal or insertion of the pins. The jaws are movable to the closed position to capture the pins and provide the pivotal connections.

Although beneficial results may be obtained through the use of the truck deck mounted cargo handling apparatus, as described above, the cargo platform rests upon the support frame solely by its own weight. This creates a potential problem, as the cargo platform tends to bounce up and down on the support frame when the truck is travelling over rough terrain. This bouncing can result in misalignment, can damage either the cargo platform, the support frame or other components, and can damage cargo. Even more beneficial results may, therefore, be obtained when an underlying bracket is positioned at the second end of the cargo platform with a projecting portion extending toward the first end of the cargo platform. The projecting portion of the bracket engages the support frame when the cargo platform is in the resting position. This holds the cargo platform to the support frame when the truck is in motion.

Although beneficial results may be obtained through the use of the truck deck mounted cargo handling apparatus, as described above, it is desirable that the ability to carry some cargo in the limited space under the cargo platform not be lost. It is also desirable to take measures to prevent theft of such cargo. Even more beneficial results may, therefore, be obtained when a flap is pivotally mounted to the second end of the support frame. The flap overlies a tailgate of a truck when the support frame is secured in position on the truck deck. The cargo platform has an underlying flap engaging member that presses the flap against the tailgate of the truck when the cargo platform is in the resting position. This prevents the tailgate of the truck from being opened with the cargo platform in the resting position.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
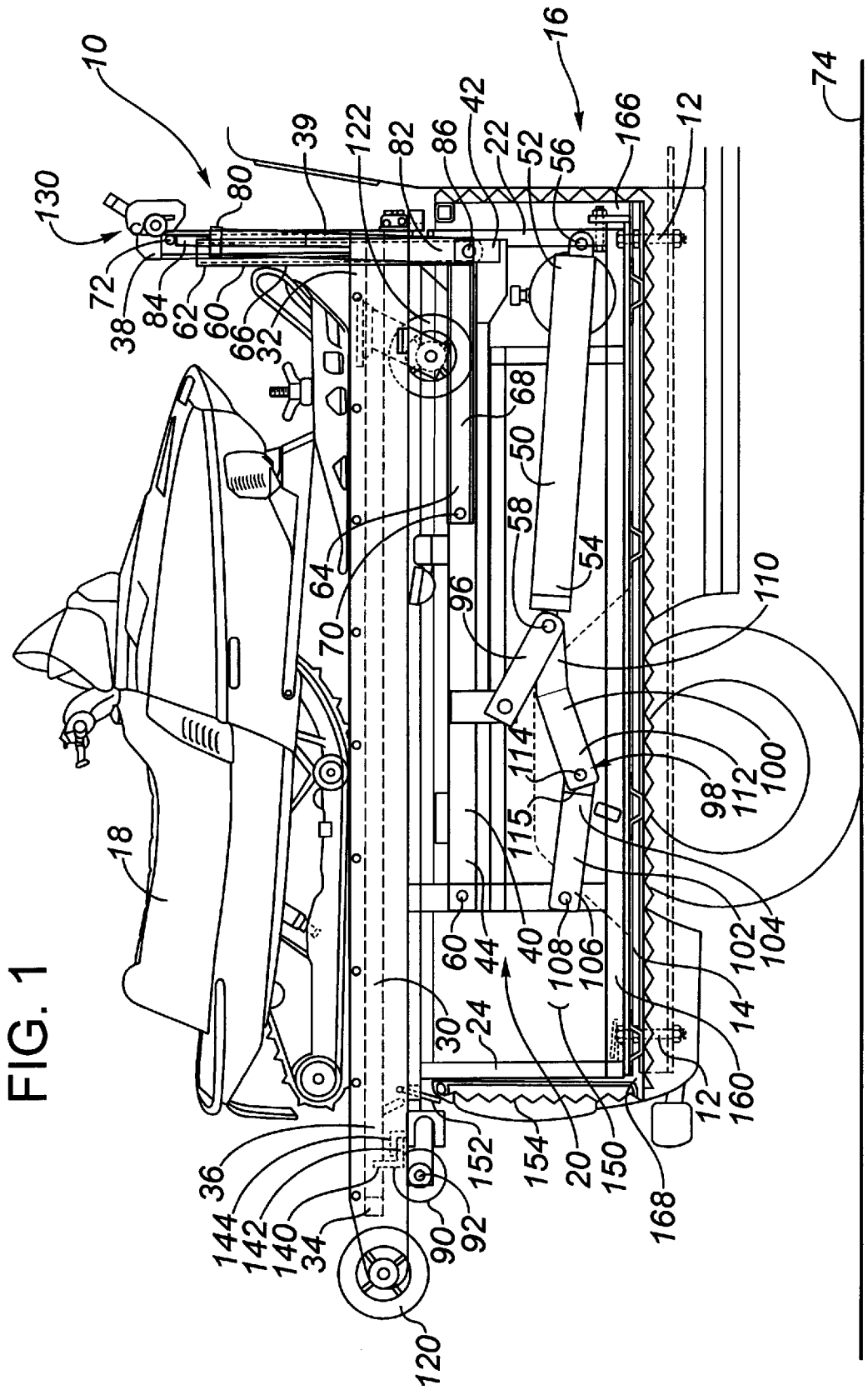
FIG. 1 is side elevation of a truck deck mounted cargo handling apparatus constructed in accordance with the teachings of the present invention with the cargo platform in a transport position.

The preferred embodiment, a truck deck mounted cargo handling apparatus with a ground level loading and unloading position generally identified by reference numeral 10, will now be described with reference to FIGS. 1 through 15.

Referring to FIG. 1, apparatus 10 is secured by bolts 12 to a deck 14 of a truck 16. It is preferred that bolts 12 extend through deck 14 to attach to the frame of the truck (not shown) to provide maximum strength. A cargo such as a recreational vehicle 18 can then be loaded and unloaded on to truck 16 using apparatus 10 as will hereinafter be described, and transported by truck 16 while supported on apparatus 10. Apparatus 10 has a support frame 20 and a cargo carrier, such as cargo platform 30.

Figure 14:
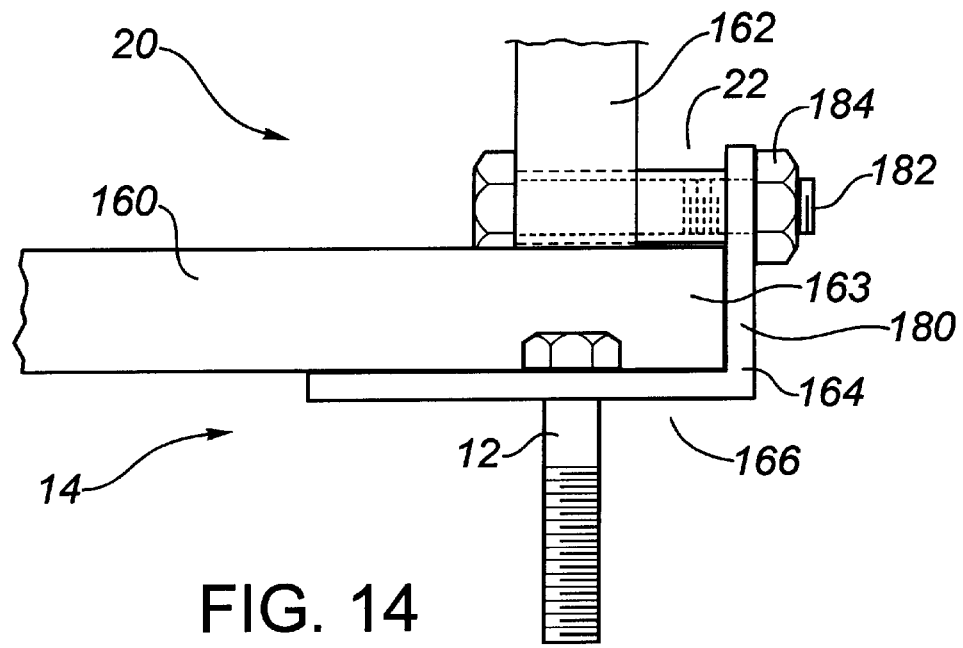
FIG. 14 is a detailed end elevation view of the truck deck mounted cargo handling apparatus illustrated in FIG. 1, showing attachment of the first end of the support frame to a truck deck.
Figure 15:
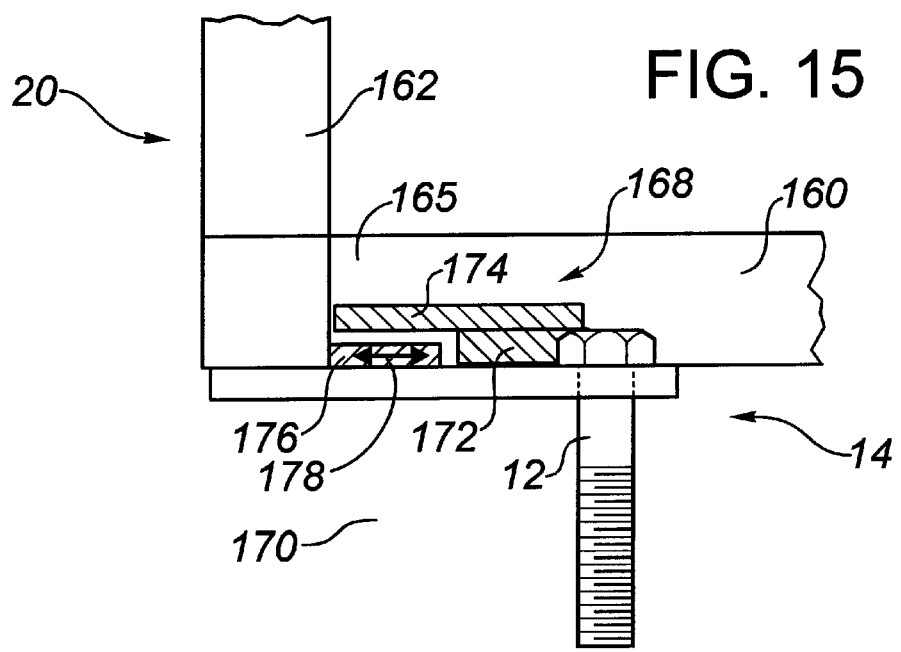
FIG. 15 is a detailed end elevation view of the truck deck mounted cargo handling apparatus illustrated in FIG. 1, showing attachment of the second end of the support frame to a truck deck.

Support frame 20 has a first end 22, a second end 24, and opposed sides 26. Referring to FIGS. 14 and 15, a horizontal base member 160 is at each side 26 of support frame 20. Referring to FIG. 14, a first vertical member 162 is attached to a front end 163 of each horizontal base member 160. A first support frame securing bracket 164 is mounted using one of bolts 12 to a front end 166 of truck bed 14. Referring to FIG. 15, a second vertical member is attached at a rear end 165 of each horizontal base member 160. A second support frame securing bracket 168 is mounted using one of bolts 12 to a rear end 170 of truck bed 14. Second support frame securing bracket has a first member 172 and a second member 174 partly overlying first member 172 and extending toward rear end 170 of truck bed 14. A bracket engaging member 176 is attached to second end 24 of support frame 20 adjacent to second vertical member 162. Support frame 20 is mounted on truck bed as will now be described. Referring to FIG. 15, support frame 20 is moved horizontally along truck bed 14 until bracket engaging member 176 engages second support frame securing bracket 168. Referring to FIG. 14, when support frame 20 has been moved as far as possible toward front end 166 of truck bed 14 first end 22 of support frame 20 abuts a vertical portion 180 of each of first support frame securing brackets 164. Support frame 20 is secured to each of first support frame securing brackets using a nut 184 and a bolt 182.

Cargo platform 30 has a first end 32, a second end 34, and opposed sides 36. Referring to FIG. 6, a pair of vertical members 38 is positioned at opposed sides 36 at first end 32. Each of vertical members 38 is supported in a vertical position by a brace member 39. Referring to FIGS. 1 through 5, cargo platform 30 is movable from a transport position resting upon the support frame, illustrated in FIG. 1, through intermediate positions illustrated in FIGS. 2 through 4, to a loading and unloading position resting at ground level, illustrated in FIG. 5. A pair of primary lifting arms 40 is provided each having a first end 42 and a second end 44. Second end 44 of primary lifting arm 40 is pivotally secured at a connection 60 to second end of support frame 20. Primary lifting arms 40 are moveable between a resting position substantially parallel to support frame 20, illustrated in FIGS. 1 and 10, and a lifting position in an angular orientation to support frame 20, illustrated in FIGS. 3 through 5. A pair of primary expandable hydraulic actuators 50 is provided which each have a first end 52 and a second end 54. First end 52 of each primary hydraulic actuator 50 is pivotally secured at a connection 56 to one of opposed sides 26 at first end 22 of support frame 20. Second end 54 of each of primary hydraulic actuators 50 is pivotally secured at a connection 58 to one of primary lifting arms 40. Referring to FIGS. 1 through 5, primary hydraulic actuators are expandable to raise primary lifting arms 40 from resting position, illustrated in FIG. 1, through a range of motion of in excess of 110 degrees to lifting position, illustrated in FIGS. 2 through 5.

Figure 3:
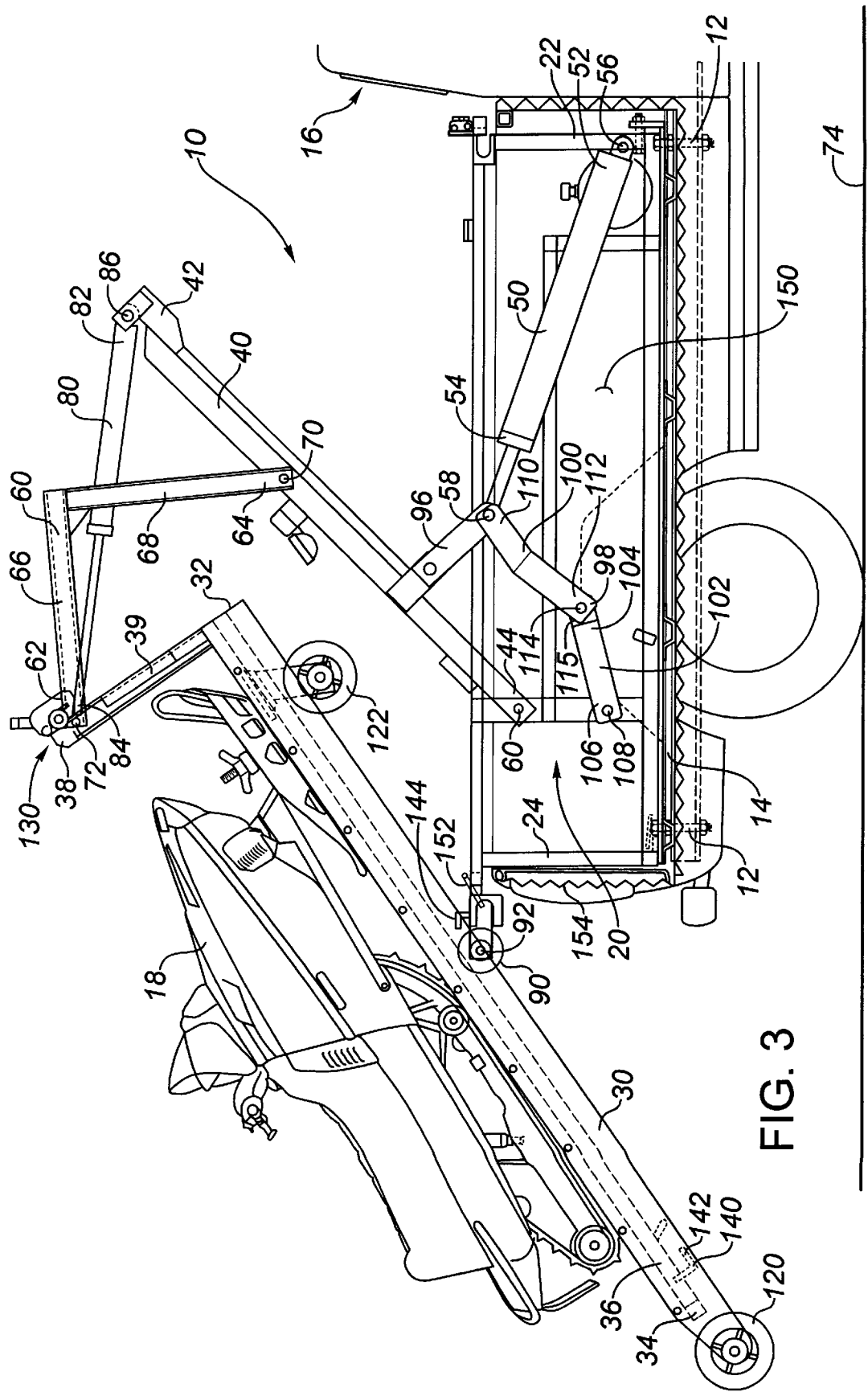
FIG. 3 is a second side elevation view of the truck deck mounted cargo handling apparatus illustrated in FIG. 1, with the cargo platform in the process of being moved to a loading and unloading position.
Figure 4:
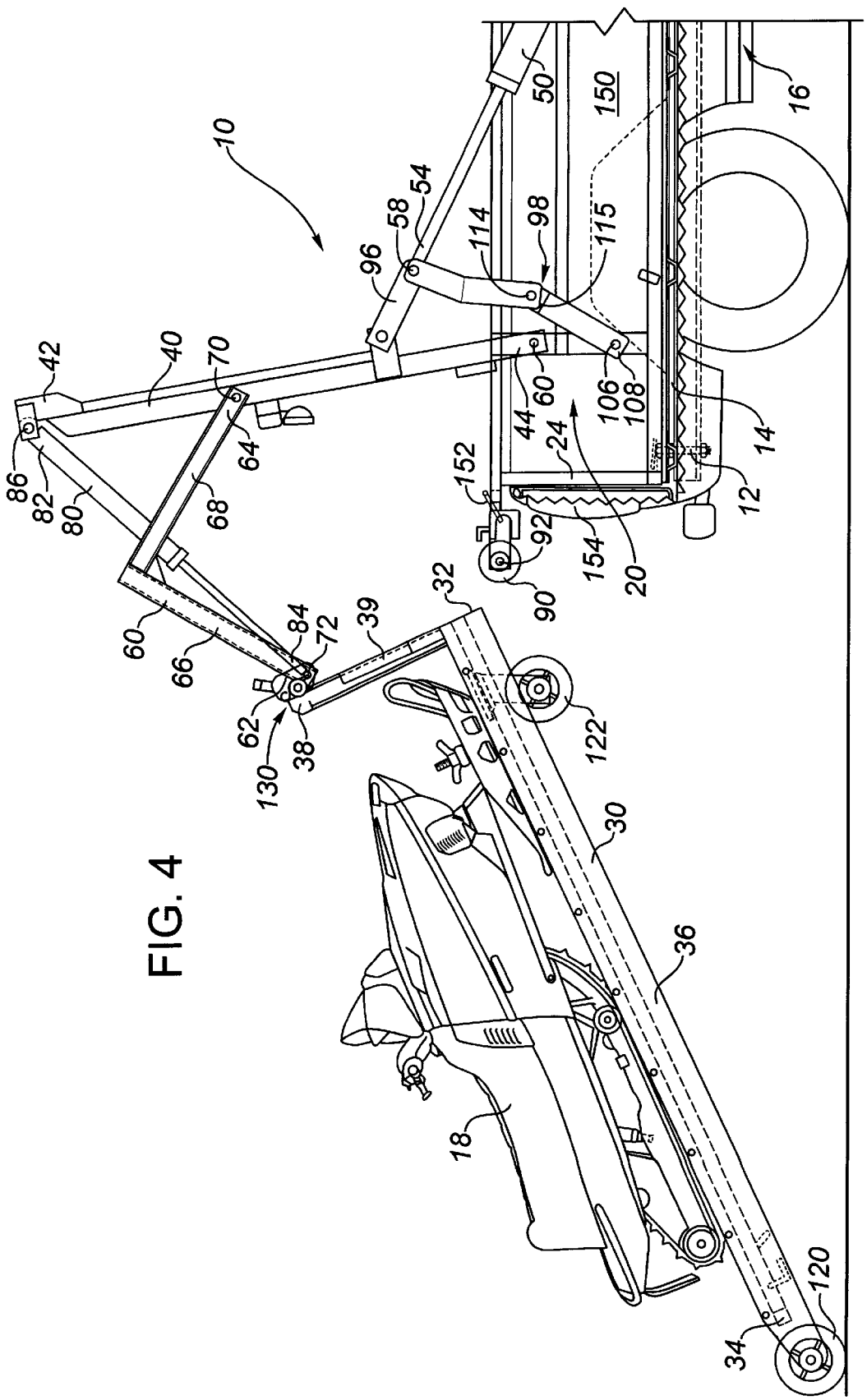
FIG. 4 is a second side elevation view of the truck deck mounted cargo handling apparatus illustrated in FIG. 1, with the cargo platform in the process of being moved to a loading and unloading position.
Figure 5:
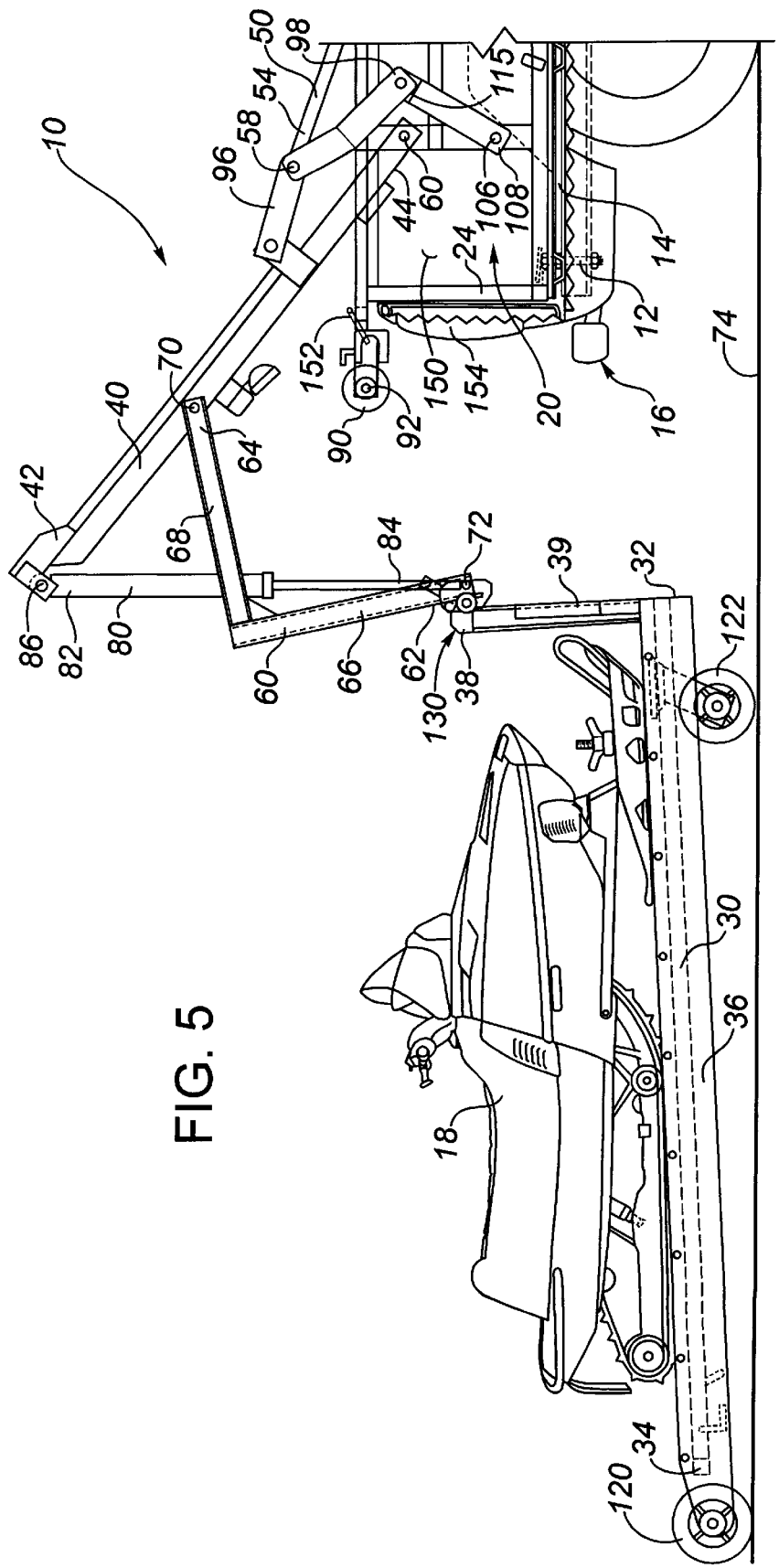
FIG. 5 is a side elevation view of the truck deck mounted cargo handling apparatus illustrated in FIG. 1, with the cargo platform in the loading and unloading position.
Figure 6:
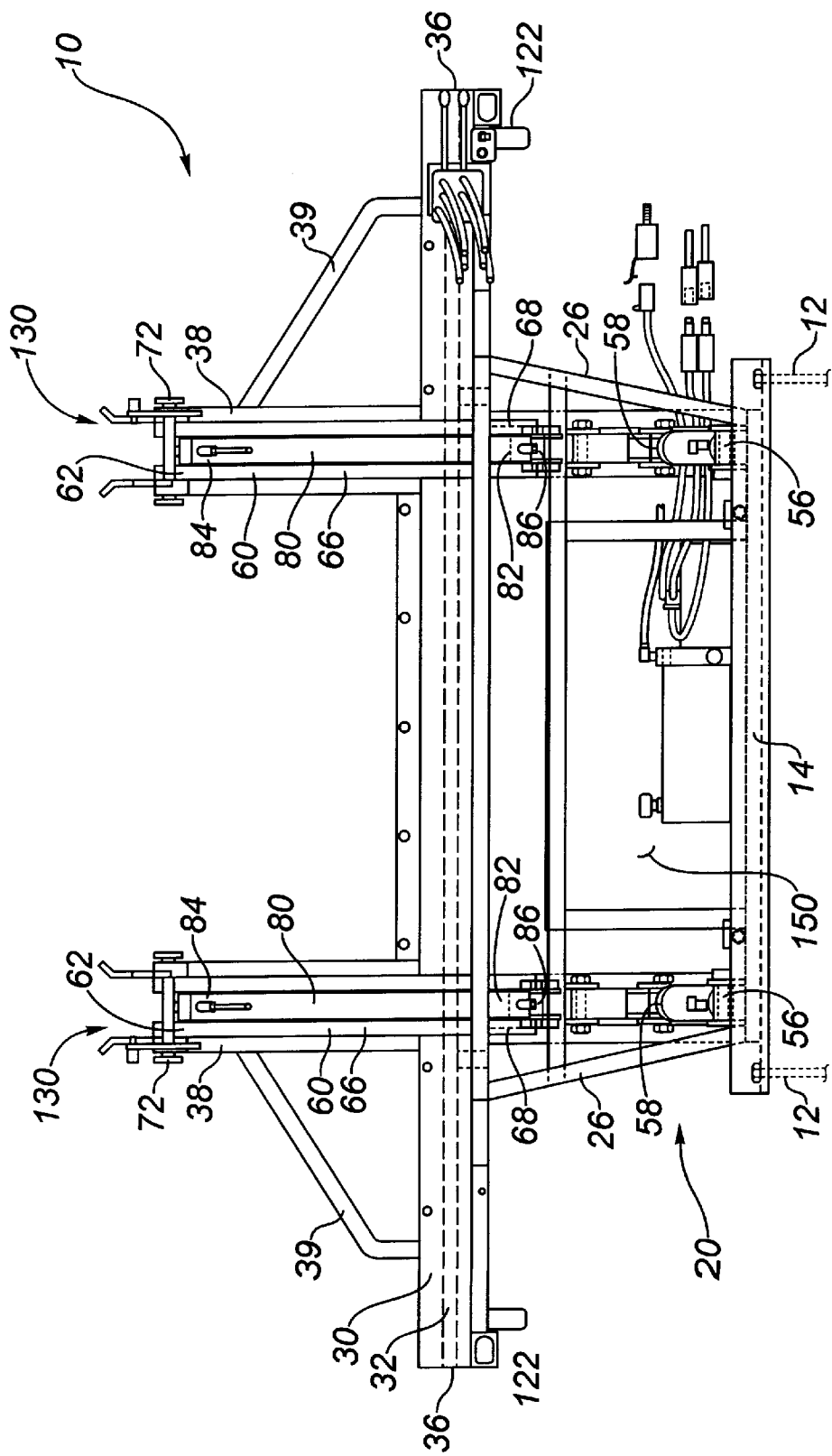
FIG. 6 is a front elevation view of the truck deck mounted cargo handling apparatus illustrated in FIG. 1.

Referring to FIGS. 1 through 5, a pair of generally "L" shaped secondary lifting arms 60 is provided each having a first end 62, a second end 64, a first portion 66 and a second portion 68. Second end 64 of each of secondary lifting arms 60 is pivotally secured at a connection 70 to one of primary lifting arms 40. First end 62 of each of secondary lifting arms 60 is pivotally secured at a connection 72 to one of vertical members 38 of cargo platform 30. Referring to FIGS. 1 and 5, secondary lifting arms 60 are moveable from a resting position to a lifting position. Referring to FIG. 1, in the resting position second portion 68 of each of secondary lifting arms 60 is substantially parallel to one of primary lifting arms 40 and first portion 66 of each of secondary lifting arms 60 is substantially parallel to one of vertical members 38 of cargo platform 30. Referring to FIGS. 2 through 5, in the lifting position first portion 66 of each of secondary lifting arms 60 is in an angular orientation relative to primary lifting arms 40. Referring again to FIGS. 1 through 5, a pair of secondary expandable hydraulic actuators 80 is provided each having a first end 82 and a second end 84. First end 82 of each of secondary hydraulic actuators 80 is pivotally secured at a connection 86 to first end of one of the primary lifting arms. Second end 84 of each of secondary hydraulic actuators 80 is pivotally secured at connection 72 to first end 62 of one of secondary lifting arms 60. Referring to FIGS. 1 and 5, secondary hydraulic actuators 80 are expandable to raise secondary lifting arms 60 from resting position, illustrated in FIG. 1, to lifting position, illustrated in FIGS. 2 through 5.

Figure 2:
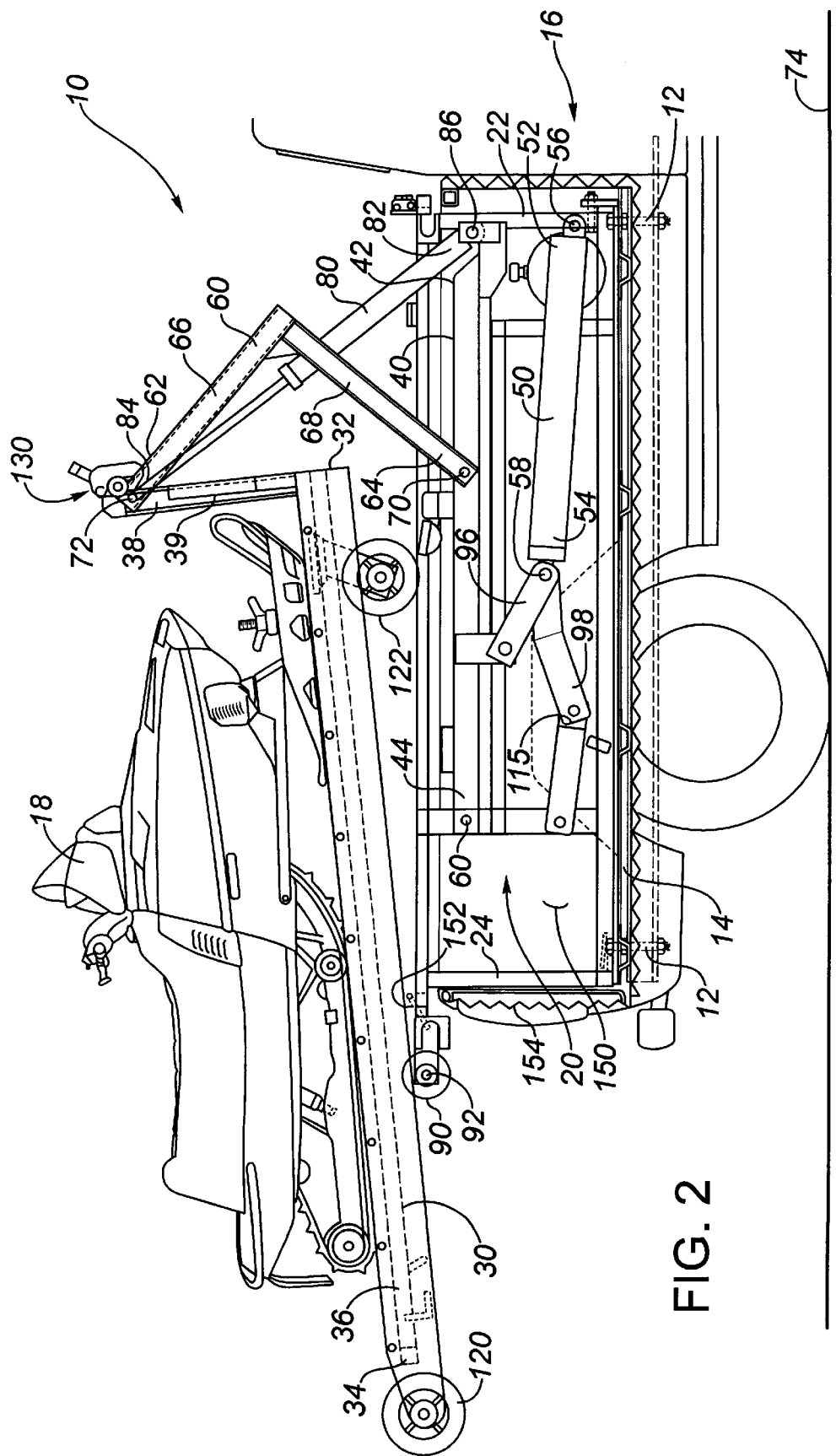
FIG. 2 is a first side elevation view of the truck deck mounted cargo handling apparatus illustrated in FIG. 1, with the cargo platform in the process of being moved to a loading and unloading position.

Referring to FIG. 1, before operation secondary lifting arms 60 are in resting position. Referring to FIG. 2, secondary arms 60 are moved to lifting position by activating secondary hydraulic cylinders, thereby moving first end 32 of cargo platform 30 toward second end 24 of support frame 20. Referring to FIGS. 3 and 4, primary lifting arms 40 are then moved through a range of motion of at least 110 degrees to push first end 32 of cargo platform 30 past second end 24 of support frame 20. Referring to FIG. 5, cargo platform 30 is thereby lowered to ground level 74.

Referring again to FIG. 5, apparatus 10 mounted on truck deck 14, as described above, provides an alternative configuration of hydraulics that is capable of providing a ground level loading and unloading position.

Figure 13:
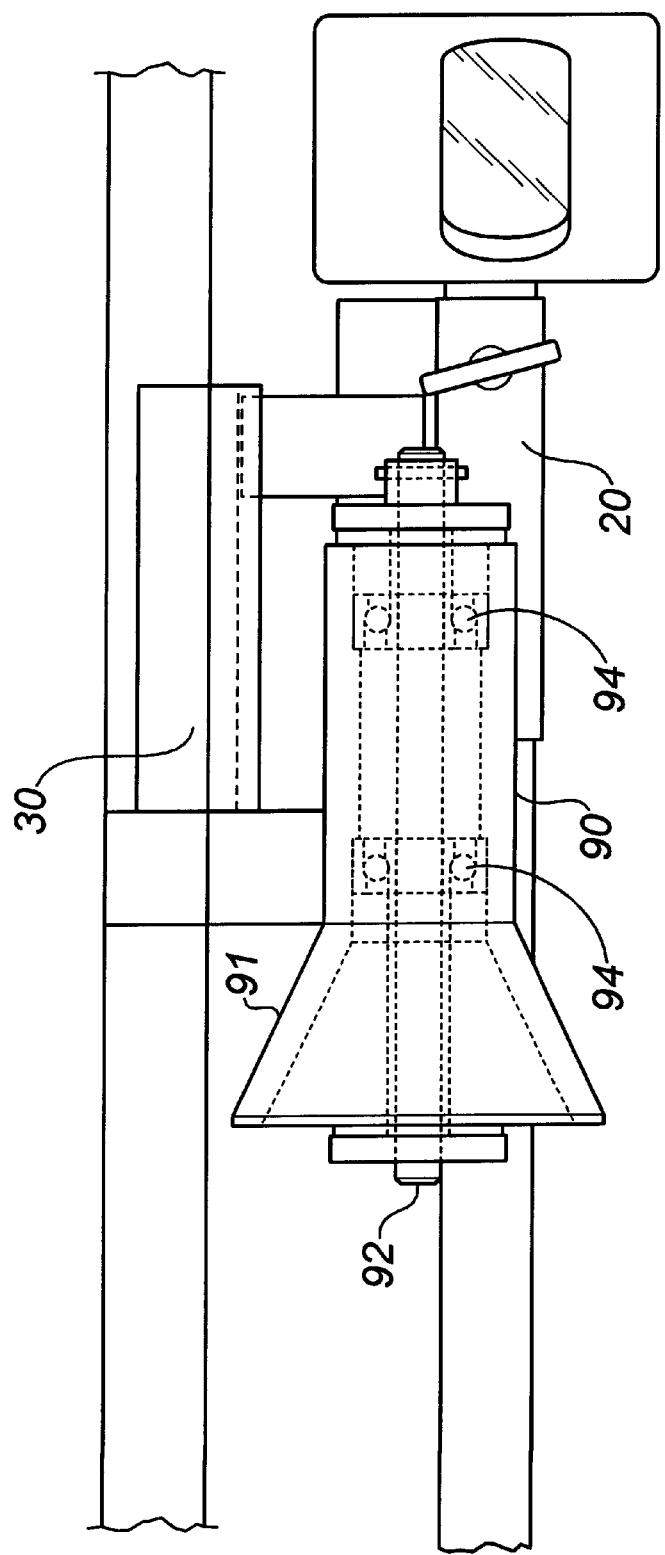
FIG. 13 is a detailed end elevation view of cargo platform support rollers for the truck deck mounted cargo handling apparatus illustrated in FIG. 1.

Referring to FIG. 1, cargo platform 30 is supported by rollers 90 positioned on opposed sides 26 at second end 24 of support frame 20. Rollers 90 reduce friction so there is less restriction to movement of cargo platform 30. Referring to FIG. 13, in the preferred embodiment rollers 90 have a wedge shaped outside portion 91. Rollers 90 with a wedge shaped outer portion 91 help urge cargo platform 30 into alignment with support frame 20. Alignment becomes important when cargo platform 30 is lifted from ground level 74 and positioned back onto support frame 20. Each one of rollers 90 is supported by a shaft 92 that is journaled for rotation along its length by at least two load bearings 94. Rollers 90 must bear both the weight of cargo platform 30 and any cargo 18 placed upon it. Depending upon the cargo 18 being carried the load capacity of rollers 90 can become important.

Referring to FIGS. 1 through 5, it is important that primary lifting arms 40 have a range of pivotal movement about connection 60 of between 110 degrees and 160 degrees. Referring to FIG. 5, if said range of movement is less than 110 degrees the distance becomes too great for secondary lifting arms 40 to reach down to place cargo platform 30 at ground level 74. If said range of movement is in excess of 160 degrees, primary lifting arms 40 have problems lifting cargo platform 30 from ground level 74. Referring again to FIGS. 1 through 5, pivotal linkages 96 are provided between each of primary lifting arms 40 and second end 54 of primary hydraulic actuators 50 to increase the range of motion of the primary lifting arms 40 in the lifting position illustrated in FIG. 5.

Referring to FIG. 2, when primary hydraulic actuators 50 begin their motion from a resting position said motion has a substantial horizontal force component. With use over time, this horizontal force can strain pivotal connection 58 between second end 54 of primary hydraulic actuators 50 and primary lifting arm 40. Referring again to FIGS. 1 through 5, motion converting linkages 98 are provided at pivotal connection 58 between primary lifting arms 40 and second end 54 of primary hydraulic actuators 50. Each of motion converting linkages 98 includes a first leg 100 and a second leg 102. Second leg 102 has a first end 104 and a second end 106. Second end 106 of second leg 102 is pivotally secured to support frame 20 at a connection 108 in parallel spaced relation to primary support arms 40. First leg 100 has a first end 110 and a second end 112. Second end 112 of first leg 100 is pivotally secured at a connection 114 to first end 104 of second leg 102 with a rotational stop 115 positioned therebetween. First end 110 of first leg 100 is secured to pivotal connection 58 between primary lifting arm 40 and primary hydraulic actuator 50. Referring to FIG. 1, in resting position each one of first leg 100 and second leg 102 are substantially axially aligned with primary hydraulic actuator 50 on a same side 36 of cargo platform 30. Referring to FIGS. 2 through 4, first leg 100 and pivotal linkages 96 open with a scissor action upon expansion of primary actuators 50. First leg 100 and second leg 102 pivot about connection 114 in response to force exerted by primary actuators 50 until rotational stop 115 is encountered and thereafter provide resistance to expansion of primary actuators 50 to force primary actuators 50 to assume an upwardly inclined orientation during expansion.

Figure 7:
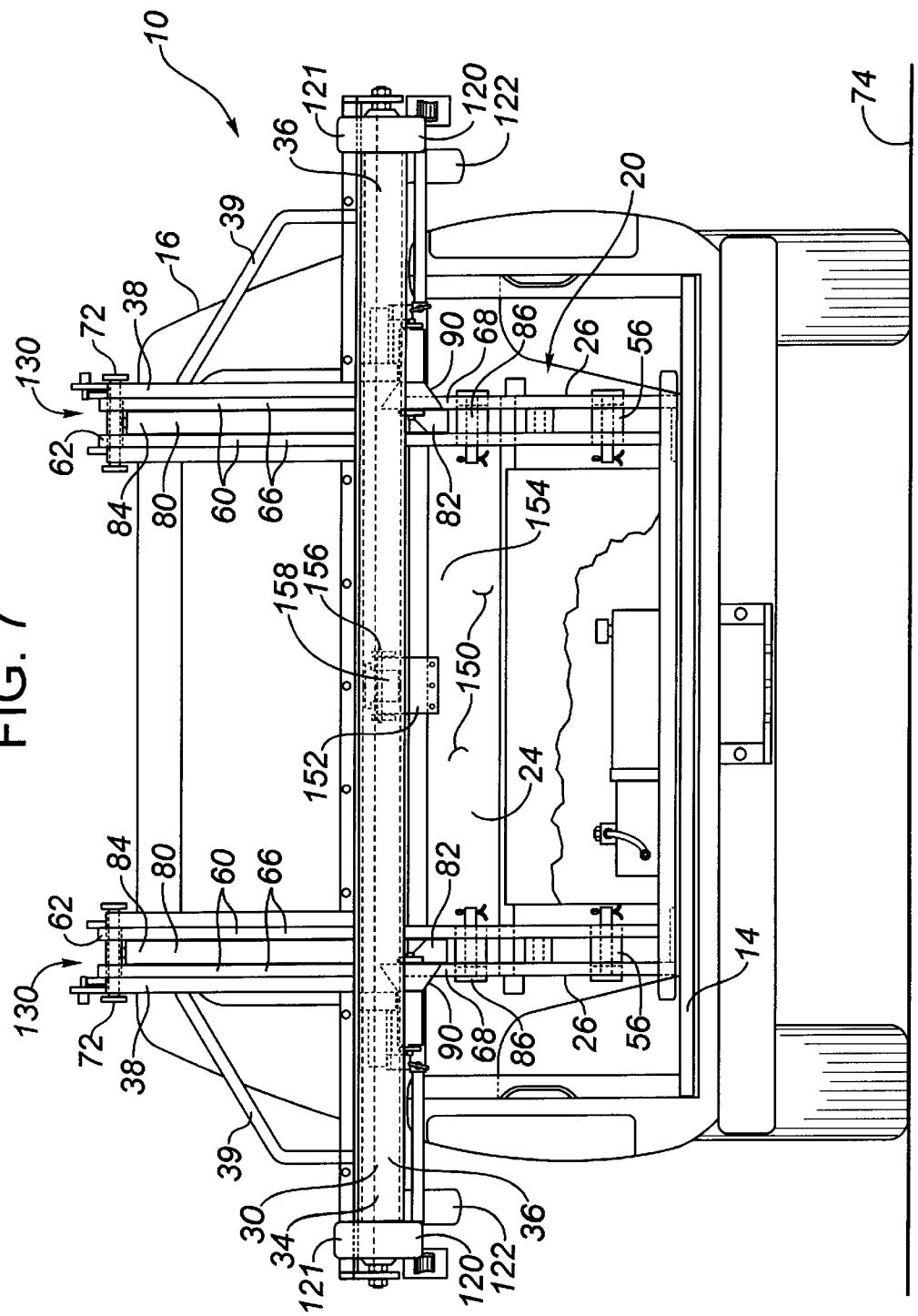
FIG. 7 is a rear elevation view of the truck deck mounted cargo handling apparatus illustrated in FIG. 1.
Figure 8:
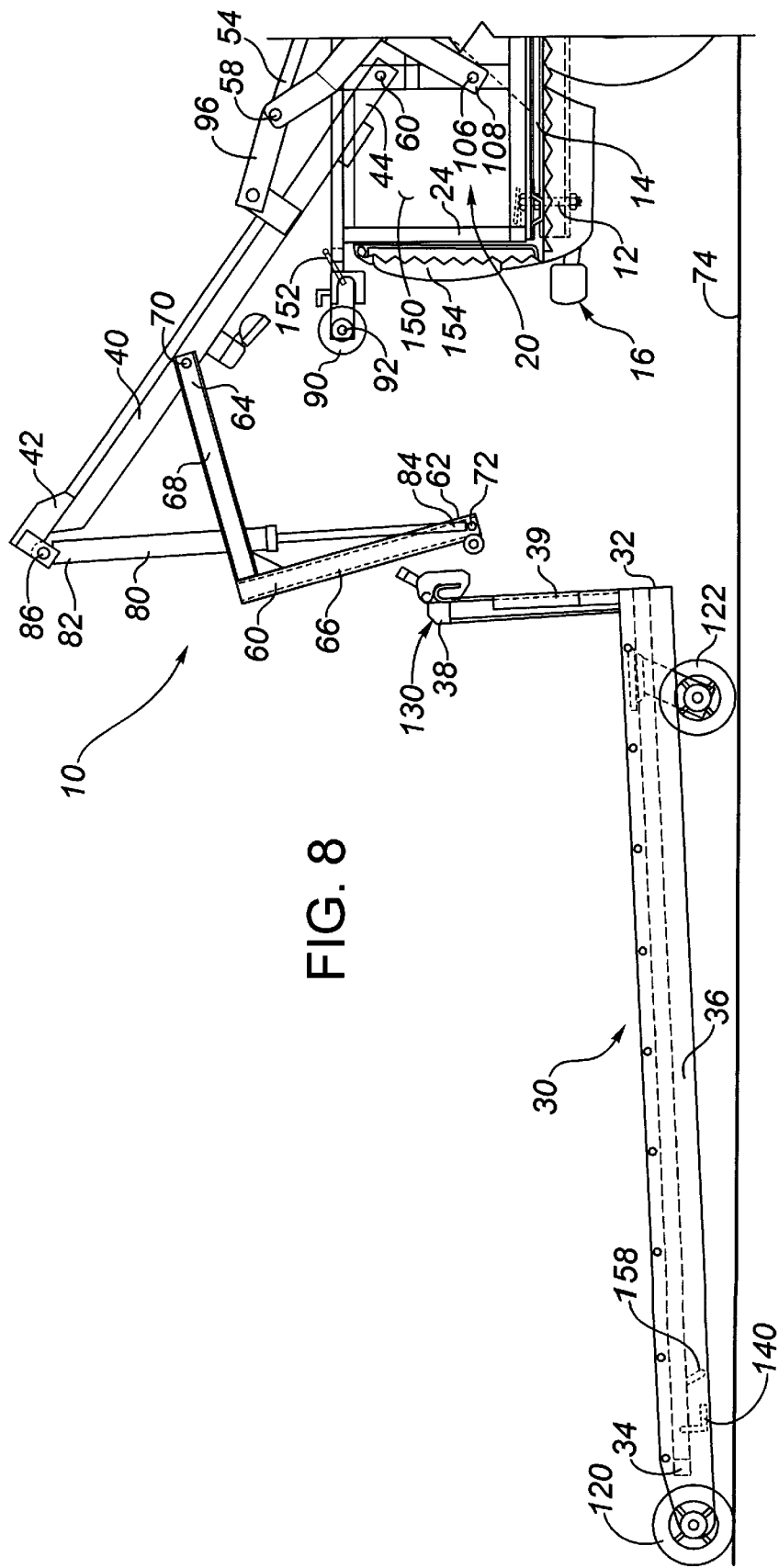
FIG. 8 is a side elevation view of the truck deck mounted cargo handling apparatus illustrated in FIG. 1, with the cargo platform detached.

Referring to FIG. 5, a single cylindrical roller 120 is positioned at second end 34 of cargo platform 30. Referring to FIG. 7, single cylindrical roller 120 extends between sides 36 of cargo platform 30. Referring to FIG. 8, single cylindrical roller 120 facilitates movement of cargo platform 30 along ground surface 74 as it moves to its final loading and unloading position. In the absence of single cylindrical roller 120, resistance from ground surface 74 can stress apparatus 10. Single cylindrical roller 120 could be replaced by a set of smaller rollers or wheels, however, when apparatus 10 is used in the winter time to carry cargo such as snowmobiles 18, wheels and conventional rollers tend to sink into the snow. In winter conditions it is, therefore, preferred that single cylindrical roller 120 is positioned at second end 34 of cargo platform 30, as described above. In view of the fact that single cylindrical roller 120 extends between opposed sides 36 of cargo platform 30 said cargo platform 30 tends to float over surface 74 when said surface 74 is snow or sand. As a smooth surfaced single cylindrical roller 120 moves over snow or wet sand, it tends to slide laterally when unloaded on a sloped surface 74. Referring to FIG. 7, single cylindrical roller 120 has guide flanges 121 at each end. Guide flanges 121 give single cylindrical roller 120 increased lateral stability. A pair of omnidirectional castor wheels 122 is positioned at first end 32 of cargo platform 30. Omnidirectional castor wheels 122 could be replaced by wheels or rollers. However, when cargo platform 30 is detached from secondary lifting arms 60, as will hereinafter be further described, omnidirectional castor wheels 122 can be used to manually steer cargo platform 30.

Figure 9:
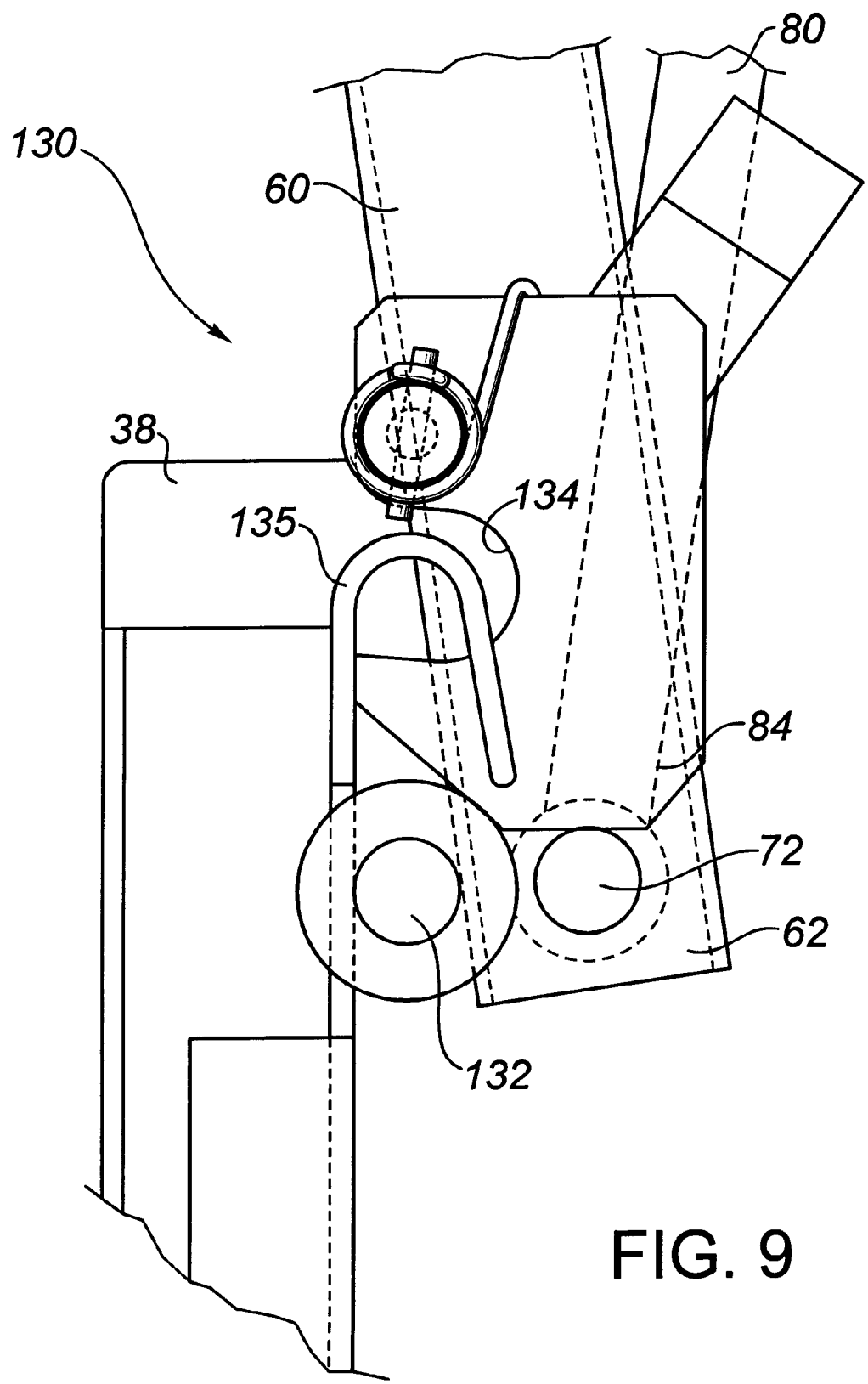
FIG. 9 is a detailed side elevation view of a quick release connection for the truck deck mounted cargo handling apparatus illustrated in FIG. 8.

Referring to FIG. 8, cargo platform 30 can be detached from support frame 20. A quick release linkage 130 is provided at each of pivotal connections 72 between first end 62 of each of secondary lifting arms 60 and vertical members 38 of cargo platform 30. Referring to FIG. 9, each of quick release linkages 130 includes a pin 132 and a pin engaging jaw 134 movable between an open position (not illustrated) and a closed position. In the embodiment illustrated in FIG. 9, one of pins 132 is positioned on first end 62 of each of secondary lifting arms 60 and one of pin engaging jaws 134 is positioned on each of vertical member 38 of cargo platform 30. It will be appreciated that this could be reversed with pin engaging jaws positioned on secondary lifting arms 60 with pins positioned on vertical members 38 of cargo platform 30. Jaws 134 are moved to an open position to permit withdrawal or insertion of pins 132. Jaws 134 are moved to closed position to capture pins 132. Enclosed by jaws 134 is a saddle 135 which provides a pivotal connection.

Figure 10:
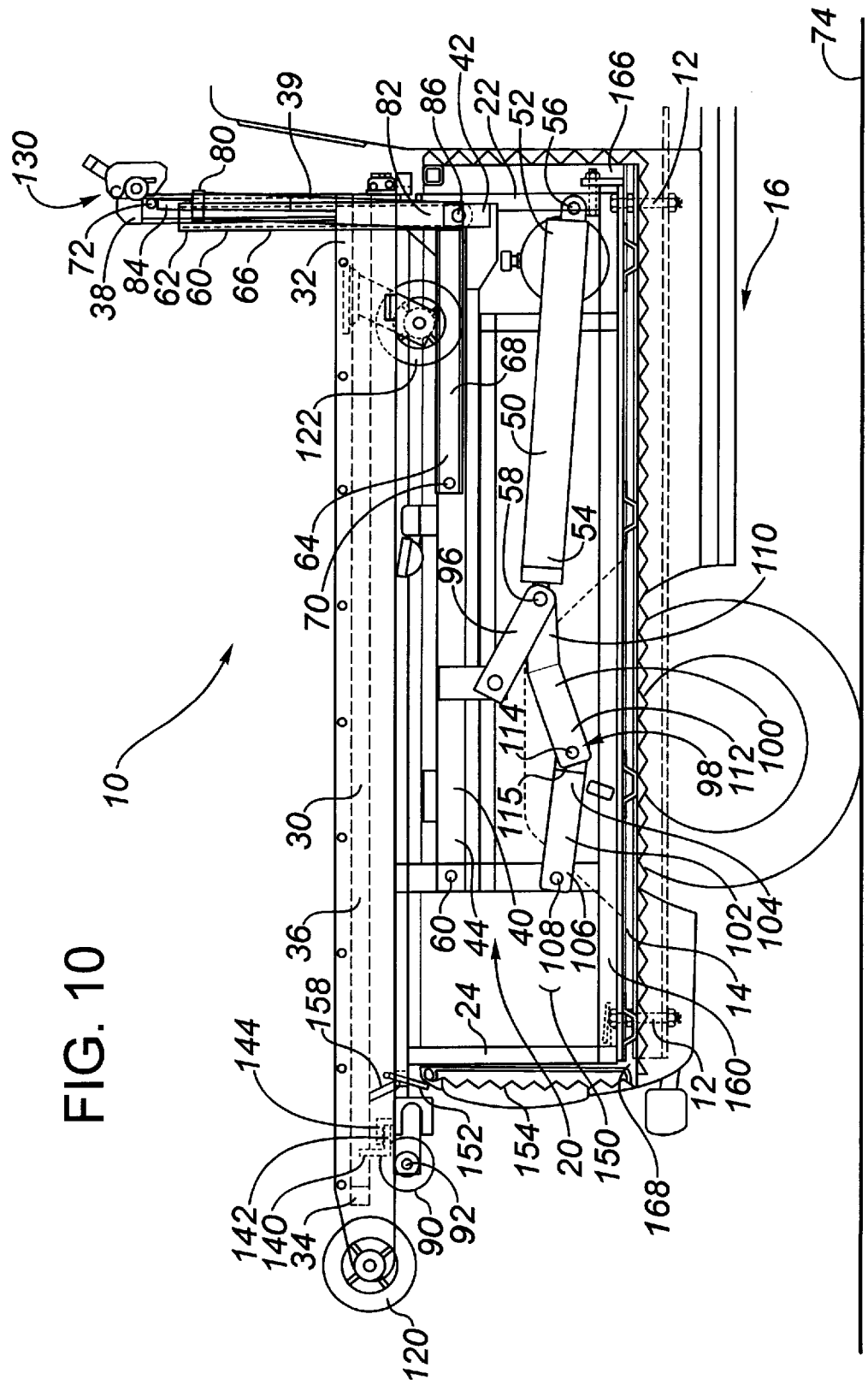
FIG. 10 is a side elevation view of the truck deck mounted cargo handling apparatus illustrated in FIG. 1, with the cargo platform in the resting position to lock the tailgate of the truck.
Figure 12:
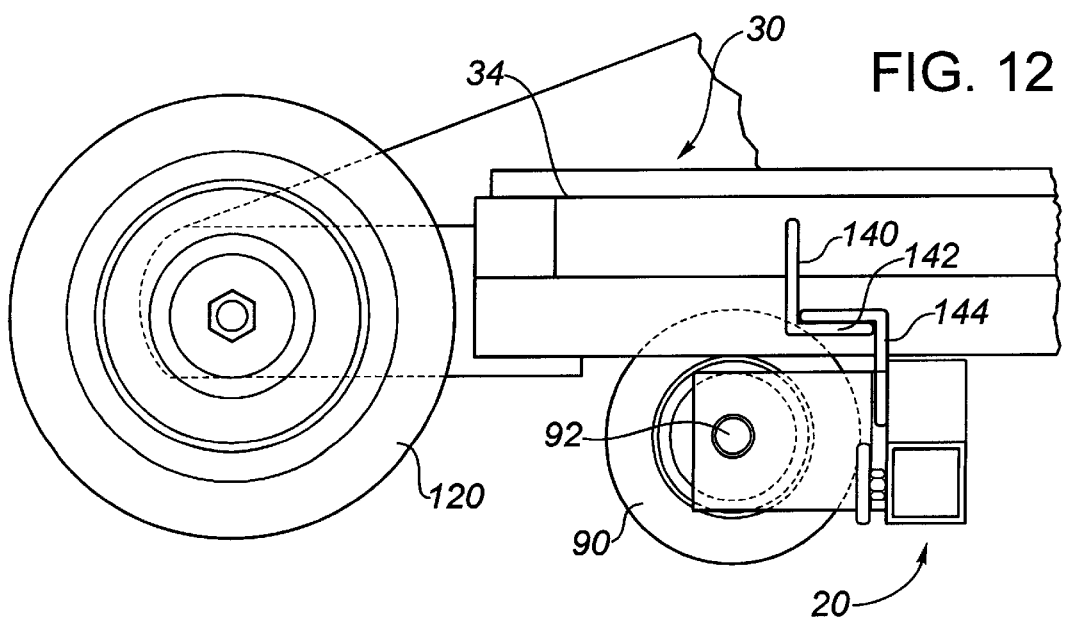
FIG. 12 is a detailed side elevation view of a mechanism for locking the cargo platform to the support frame of the truck deck mounted cargo handling apparatus illustrated in FIG. 1.

Referring to FIG. 10, cargo platform 30 rests upon support frame 20 solely by its own weight. This creates a potential problem, as an unsecured cargo platform 30 would tend to bounce up and down on support frame 20 when truck 16 is travelling over rough terrain. This bouncing can result in misalignment, can damage either cargo platform 30, support frame 20 or other components, and can damage cargo 18. Referring to FIG. 12, an underlying bracket 140 is positioned at second end 34 of cargo platform 30 with a projecting portion 142 extending toward first end 32 of cargo platform 32. Referring to FIG. 10, projecting portion 142 of bracket 140 engages a bracket member 144 of support frame 20 when cargo platform 30 is in the resting position. Engagement of bracket 40 with bracket member 144 holds cargo platform 30 to support frame 20 when truck 16 is in motion, and thereby prevents cargo platform 30 from bouncing up and down relative to support frame 20.

Figure 11:
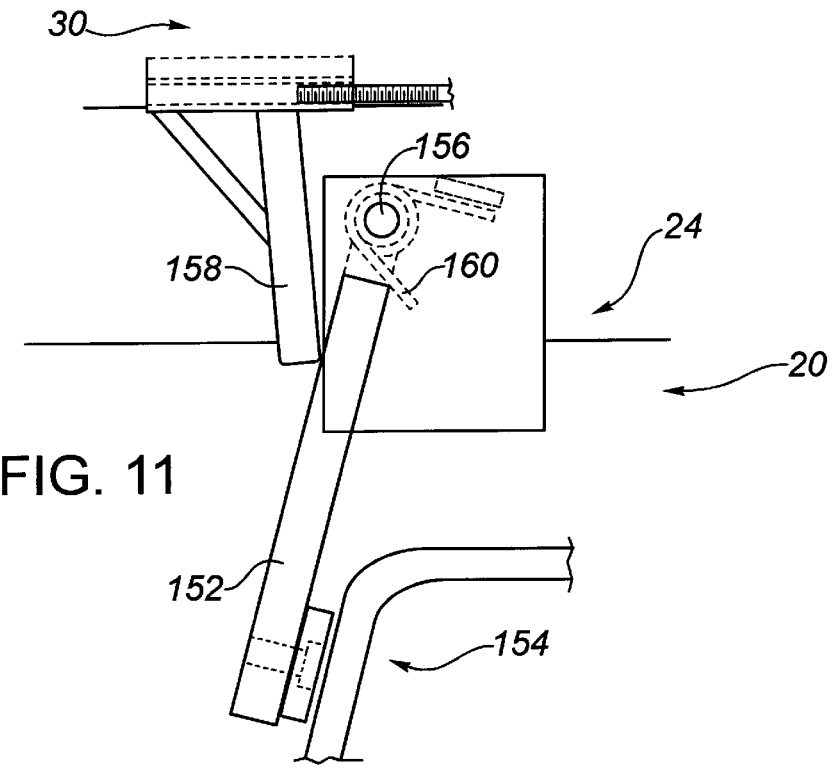
FIG. 11 is a detailed side elevation view of tailgate locking mechanism for the truck deck mounted cargo handling apparatus illustrated in FIG. 10.

Referring to FIG. 10, when apparatus 10 is mounted on truck 16 it is desirable that use is not lost of a limited space 150 under cargo platform 30 for carrying additional cargo. It is also desirable to take measures to prevent theft of such cargo. Referring to FIG. 11, a flap 152 is pivotally mounted at a connection 156 to second end 24 of support frame 20. Flap 152 overlies a tailgate 154 of truck 16 when support frame 20 is secured in position on truck deck 14, as illustrated in FIG. 10. Referring again to FIG. 11, cargo platform 30 has an underlying flap engaging member 158 that presses flap 152 against tailgate 154 of truck 16, in opposition to a force exerted by a spring 160, when cargo platform 30 is in the resting position. This prevents tailgate 154 of truck 16 from being opened with cargo platform 30 in the resting position. Referring to FIG. 5, when cargo platform 30 is not secured in position on support platform 20 spring 160 exerts a force on flap 152 thereby disengaging flap 152 from tailgate 154. Tailgate 154 can then be opened to enable access to space 150.

In the preferred version secondary lifting arms form an "L" shaped or "C" shaped crook. This enables secondary lifting arms to operate without the necessity of removing or lowering the tailgate of the truck. The crook shape enables the secondary lifting arms to reach over top of the tailgate.

It will be apparent to one skilled in the art that modifications may be made to the illustrated embodiment without departing from the spirit and scope of the invention as hereinafter defined in the claims.

What is claimed is:

1. A truck deck mounted cargo handling apparatus with a ground level loading and unloading position, comprising:
    a support frame having a first end, a second end, and opposed sides;
    means for securing the support frame to a truck deck;
    a cargo carrier having a first end, a second end, and opposed sides;
    means for moving the cargo carrier from a transport position resting upon the support frame to a loading and unloading at ground level, including:
        at least one primary lifting arm having a first end and a second end, the second end of the at least one primary lifting arm being pivotally secured at the second end of the support frame for movement between a resting position on the support frame and a lifting position in an angular orientation to the support frame;
        at least one primary expandable actuator having a first end and a second end, the first end of the at least one primary actuator being pivotally secured at the first end of the support frame, the second end of the at least one primary actuator being pivotally secured to the at least one primary lifting arm, the at least one primary actuator being expandable to raise the at least one primary lifting arm from the resting position through a range of motion in excess of 110 degrees in the lifting position;
        a pivotal linkage provided between the at least one primary lifting arm and the second end of the at least one primary actuator, thereby increasing the range of motion of the at least one primary lifting arm in the lifting position;
    at least one secondary lifting arm having a first end and a second end, the second end of the at least one secondary lifting arm being pivotally secured to the at least one primary lifting arm, the first end of the at least one secondary lifting arm being pivotally secured to the first end of the cargo carrier, the at least one secondary lifting arm being moveable from a resting position to a lifting position, in the resting position the at least one secondary lifting arm rests upon the at least one primary lifting arm and in the lifting position the at least one secondary lifting arm being in an angular orientation relative to the at least one primary lifting arm;
    at least one secondary expandable actuator having a first end and a second end, the first end of the at least one secondary actuator being pivotally secured at the first end of the at least one primary lifting arm, the second end of the at least one secondary actuator being pivotally secured to the first end of the at least one secondary lifting arm, the at least one secondary actuator being expandable to raise the at least one secondary lifting arm from the resting position to the lifting position;
    in operation the at least one secondary lifting arm being moved to the lifting position by the at least one secondary actuator to move the first end of the cargo carrier toward the second end of the support frame, the at least one primary lifting arm being moved through a range of motion of at least 110 degrees to push the first end of the cargo carrier past the second end of the support frame and lower the cargo carrier to ground level.

2. The truck deck mounted cargo handling apparatus as defined in claim 1, wherein the cargo carrier is a platform.

3. The truck deck mounted cargo handling apparatus as defined in claim 1, wherein there is provided two primary lifting arms, two primary expandable actuators, two secondary lifting arms and two secondary expandable actuators.

4. The truck deck mounted cargo handling apparatus as defined in claim 1, wherein the at least one primary expandable actuator and the at least one secondary expandable actuator are hydraulic.

5. The truck deck mounted cargo handling apparatus, as defined in claim 1, wherein vertical attachment members are positioned on the opposed sides at the first end of the cargo carrier.

6. The truck deck mounted cargo handling apparatus, as defined in claim 1, wherein the at least one secondary lifting arm is in the form of a crook, thereby enabling the at least one secondary lifting arm to reach over a tailgate of a truck.

7. The truck deck mounted cargo handling apparatus, as defined in claim 6, wherein the crook is an "L" shape.

8. The truck deck mounted cargo handling apparatus, as defined in claim 1, wherein the cargo carrier is supported by rollers positioned on the opposed sides at the second end of the support frame.

9. The truck deck mounted cargo handling apparatus, as defined in claim 8, wherein the rollers are wedge shaped, thereby urging the cargo carrier into alignment with the support frame.

10. The truck deck mounted cargo handling apparatus, as defined in claim 8, wherein the rollers are supported by a shaft journaled for rotation along its length by at least two load bearings.

11. The truck deck mounted cargo handling apparatus, as defined in claim 1, wherein a motion converting linkage is provided at a pivotal connection between the at least one primary lifting arm and the second end of the at least one primary actuator, the motion converting linkage including a first leg and a second leg, the second leg having a first end and a second end, the second end of the second leg being pivotally secured to the support frame, the first leg having a first end and a second end, the second end of the first leg being pivotally secured to the first end of the second leg with a rotational stop being positioned therebetween to limit rotational motion, the first end of the first leg being secured to the pivotal connection between the at least one primary lifting arm and the at least one primary actuator, such that the first leg and the second leg pivot where connected in response to force exerted by the at least one primary actuator until the rotational stop is encountered and thereafter provide resistance to expansion of the at least one primary actuator to force the at least one primary actuator to assume an upwardly inclined orientation during expansion.

12. The truck deck mounted cargo handling apparatus, as defined in claim 1, wherein one of wheels and rollers are positioned at the second end of the cargo carrier, thereby facilitating movement of the cargo carrier along a ground surface.

13. The truck deck mounted cargo handling apparatus, as defined in claim 12, wherein one of wheels and rollers are also positioned at the first end of the cargo carrier.

14. The truck deck mounted cargo handling apparatus, as defined in claim 13, wherein omnidirectional castor wheels are positioned at the first end of the cargo carrier.

15. The truck deck mounted cargo handling apparatus, as defined in claim 12, wherein a single cylindrical roller is positioned at the second end of the cargo carrier, the single cylindrical roller extending between the opposed sides of the cargo carrier.

16. The truck deck mounted cargo handling apparatus, as defined in claim 15, wherein the single cylindrical roller has guide flanges.

17. The truck deck mounted cargo handling apparatus, as defined in claim 1, wherein quick release linkages are provided at pivotal connections between the first end of the at least one secondary lifting arm and the first end of the cargo carrier.

18. The truck deck mounted cargo handling apparatus, as defined in claim 17, wherein the quick release linkages include pins and pin engaging jaws movable between open and closed positions, one of the pins and the pin engaging jaws being on the first end of the at least one secondary lifting arm and the other of the pins and the pin engaging jaws being at the first end of the cargo carrier, the jaws being movable to the open position to permit withdrawal or insertion of the pins, the jaws being movable to the closed position to capture the pins thereby providing a pivotal connection.

19. The truck deck mounted cargo handling apparatus, as defined in claim 1, wherein an underlying bracket is positioned at the second end of the cargo carrier with a projecting portion extending toward the first end of the cargo carrier, the projecting portion of the bracket engaging the support frame when the cargo carrier is in the resting position to hold the cargo carrier to the support frame during travel.

20. The truck deck mounted cargo handling apparatus, as defined in claim 1, wherein a flap is pivotally mounted to the second end of the support frame, the flap overlying a tailgate of a truck when the support frame is secured in position on the truck deck, the cargo carrier having an underlying flap engaging member that presses the flap against the tailgate of the truck when the cargo carrier is in the resting position, thereby preventing the tailgate of the truck being opened with the cargo carrier in the resting position.

21. A truck deck mounted cargo handling apparatus with a ground level loading and unloading position, comprising:

a support frame having a first end, a second end, and opposed sides;

means for securing the support frame to a truck deck;

a cargo carrier platform having a first end, a second end, opposed sides and vertical attachment members positioned at the opposed sides at the first end;

means for moving the cargo platform from a transport position resting upon the support frame to a loading and unloading position resting at ground level, including:

a pair of primary lifting arms each having a first end and a second end, the second end of each of the primary lifting arms being pivotally secured to one of the opposed sides at the second end of the support frame for movement between a resting position resting on the support frame and a lifting position in an angular orientation to the support frame;

a pair of primary expandable actuators each having a first end and a second end, the first end of each the primary actuators being pivotally secured to one of the opposed sides at the first end of the support frame, the second end of each of the primary actuators being pivotally secured to one of the primary lifting arms, the primary actuators being expandable to raise the primary lifting arms from the resting position through a range of motion in excess of 110 degrees in the lifting position;

pivotal linkages and motion converting linkages provided between the primary lifting arms and the second end of the primary actuators, thereby increasing the range of motion of the primary lifting arms in the lifting position and forcing the primary actuators to assume an upwardly inclined orientation during expansion;

a pair of generally secondary lifting arms being an "L" shape, each of the secondary lifting arms having a first end and a second end, the second end of each of the secondary lifting arms being pivotally secured to one of the primary lifting arms, the first end of each of the secondary lifting arms being pivotally secured to one of the vertical attachment members of the cargo platform, the secondary lifting arms being moveable from a resting position to a lifting position, in the resting position the secondary lifting arms resting on the primary lifting arms, in the lifting position the secondary lifting arms being in an angular orientation relative to the primary lifting arms;

a pair of secondary expandable actuators each having a first end and a second end, the first end of each of the secondary actuators being pivotally secured to the first end of one of the primary lifting arms, the second end of each of the secondary actuators being pivotally secured to the first end of one of the secondary lifting arms, the secondary actuators being expandable to raise the secondary lifting arms from the resting position to the lifting position;

in operation the secondary lifting arms are moved to the lifting position by the secondary actuators to move the first end of the cargo platform toward the second end of the support frame, the primary lifting arms are then moved by the primary actuators through a range of motion of at least 110 degrees to push the first end of the cargo platform past the second end of the support frame and lower the cargo platform to ground level.

22. The truck deck mounted cargo handling apparatus as defined in claim 21, wherein the primary expandable actuators and the secondary expandable actuators are hydraulic.

23. The truck deck mounted cargo handling apparatus, as defined in claim 21, wherein the cargo platform is supported by rollers positioned on the opposed sides at the second end of the support frame, the rollers being wedge shaped, thereby urging the cargo platform into alignment with the support frame, the rollers being supported by a shaft that is journaled for rotation along its length by at least two load bearings.

24. The truck deck mounted cargo handling apparatus, as defined in claim 21, wherein one of wheels and rollers are positioned at the second end of the cargo platform, thereby facilitating movement of the cargo platform along a ground surface.

25. The truck deck mounted cargo handling apparatus, as defined in claim 21, wherein a single cylindrical guide roller having flanges is positioned at the second end of the cargo platform, the single cylindrical roller extending between the opposed sides of the cargo platform, and omnidirectional castor wheels are positioned at the first end of the cargo platform.

26. The truck deck mounted cargo handling apparatus, as defined in claim 21, wherein quick release linkages are provided at pivotal connections between the first end of each of the secondary lifting arms and the vertical attachment members of the cargo platform, the quick release linkages including pins and pin engaging jaws movable between open and closed positions, one of the pins and the pin engaging jaws being on the first end of the secondary lifting arms and the other of the pins and the pin engaging jaws being on the vertical members of the cargo platform, the jaws being movable to the open position to permit withdrawal or insertion of the pins, the jaws being movable to the closed position to capture the pins thereby providing pivotal connections.

27. The truck deck mounted cargo handling apparatus, as defined in claim 21, wherein an underlying bracket is positioned at the second end of the cargo platform with a projecting portion extending toward the first end of the cargo platform, the projecting portion of the bracket engaging the support frame when the cargo platform is in the resting position to hold the cargo platform to the support frame during travel.

28. The truck deck mounted cargo handling apparatus, as defined in claim 21, wherein a flap is pivotally mounted to the second end of the support frame, the flap overlying a tailgate of a truck when the support frame is secured in position on the truck deck, the cargo platform having an underlying flap engaging member that presses the flap against the tailgate of the truck when the cargo platform is in the resting position, thereby preventing the tailgate of the truck being opened with the cargo platform in the resting position.

29. The truck deck mounted cargo handling apparatus, as defined in claim 21, wherein, the pivotal linkages are straight linkage members that attach between the primary lifting arms and the second end of the primary actuators, the motion converting linkages including a first leg and a second leg, the second leg having a first end and a second end, the second end of the second leg being pivotally secured to the support frame, the first leg having a first end and a second end, the second end of the first leg being pivotally secured to the first end of the second leg with a rotational stop positioned therebetween to limit rotational movement, the first end of the first leg being secured to the pivotal connection between the primary lifting arms and the primary actuators, the first legs and the linkages members opening with a scissor action upon expansion of the primary actuators with the first leg and the second leg pivoting where connected in response to force exerted by the primary actuators until the rotational stop is encountered and thereafter providing resistance to expansion of the primary actuators to force the primary actuators to assume an upwardly inclined orientation during expansion.

* * * * *